United States Patent Office 3,018,271
Patented Jan. 23, 1962

3,018,271
CROSSLINKING CONDENSATION POLYMERS WITH INTRALINEAR CYCLOBUTENE RINGS
John Lynde Anderson, Wilmington, Del., assignor to E. I. du Pont de Nemours and Company, Wilmington, Del., a corporation of Delaware
No Drawing. Filed Aug. 16, 1955, Ser. No. 528,312
5 Claims. (Cl. 260—47)

This invention relates to polymeric materials. More particularly, it relates to a new class of condensation polymers containing recurring cyclobutene rings in the polymer chain which crosslink when heated.

Condensation polymers of various types are well known, certain types such as polyamides and polyesters having achieved considerable commercial success. In certain applications, condensation polymers which can be converted to insoluble, infusible products by crosslinking treatments are employed. The common methods of crosslinking such polymers require the addition of a separate crosslinking agent or involve the evolution of volatile byproducts during the crosslinking step. These methods are satisfactory in certain cases, but in others they are not.

It is an object of this invention to provide novel linear polymers which can be crosslinked readily without separate crosslinking agents and without generating volatile byproducts. Another object is to provide a process for preparing crosslinked polymers. A further object is to provide novel crosslinked polymers. Other objects of the invention will become apparent from the specification and claims.

In accordance with this invention it has been found that polymers having a chain structure containing recurring cyclobutene rings intralineal with the chain will crosslink readily when heated to a temperature between 100° and 325° C. The polymers may be formed in any of the usual ways from structural units or monomers by including units which contain cyclobutene rings located so that at least one carbon of a ring is intralineal with a main chain of atoms extending through the units in the resulting polymer.

The polymers of this invention having cyclobutene groups which are intralineal with the polymer chain are crosslinked by heating them to a temperature of between 100° and 325° C. The crosslinking, which is believed to be due to the opening of the cyclobutene ring, takes place readily in this temperature range. The exact time required to crosslink the polymers is dependent on the particular temperature being employed, as well as on the composition of the particular polymer. At temperatures of 100-150° C. polymers comprising a large molar proportion of cyclobutene ring-containing monomer require more than five minutes to become crosslinked. At about 170–180° C. a five-minute heating period is sufficient, while at temperatures of 200–325° C. crosslinking is accomplished in less than one minute. However, when the polymer comprises only a small proportion of cyclobutene ring-containing monomer, longer times or higher temperatures are generally required. For example, a copolymer containing 5 mol percent of cyclobutene ring-containing monomer requires two minutes heating at 250° C. to become crosslinked, and one containing 15 mol percent of cyclobutene ring-containing monomer requires one minute at 200° C. At the lower temperatures mentioned above, polymers containing small proportions of cyclobutene rings in general require proportionally longer times of heating. For effective crosslinking by heating at least 1% of the repeating units should contain cyclobutene rings which are intralineal with the polymer chain.

A preferred class of novel crosslinkable polymers are linear condensation polymers containing recurring cyclobutene rings in a polymeric structure having a main chain of atoms extending through organic structural units linked by heteroatoms, at least one carbon of each cyclobutene ring being intralineal with the chain. The cyclobutene ring-containing structural units in condensation polymers of this type may be represented by the following general formula,

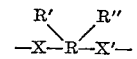

wherein R represents a cyclobutene ring, and X and X' represent linking groups in the main chain of the polymer which are attached to one to two carbons of the cyclobutene ring, each of these linking groups containing a heteroatom in the main polymer chain, and R' and R" represent extralineal substituents on the cyclobutene ring which may be hydrogen, or one or both may be an extralineal hydrocarbon substituent having a total of up to 8 carbon atoms in the two substituents, or one or both may be a carboxyl group or a group hydrolyzable to carboxyl, e.g., ester or nitrile. A greater number of carbons in the alkyl substituents tends to render the cyclobutene ring less reactive in the cross-linking process. Thus the preferred crosslinkable condensation polymers contain such structural units as the following:

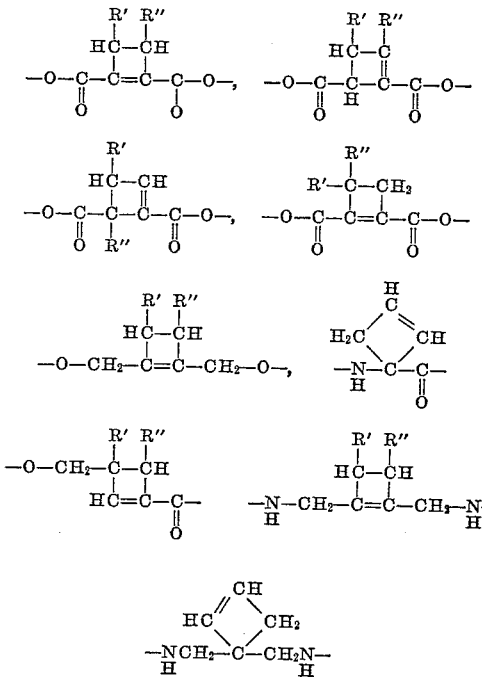

and where R' and R" are hydrogen or hydrocarbons totaling up to 8 carbon atoms, e.g., lower alkyl or phenyl substituents. The linking groups in the above formulas are merely illustrative of the various known linking groups in condensation polymers, of which polyester, polyamide, polyether, polyurethane, polyurea and their sulfur analogs, such as polythiolester and polysulfide, are the most useful types. Thus the oxygen and nitrogen heteroatoms shown above are representative of other heteroatoms, such as sulfur, as will be further illustrated. Furthermore, the cyclobutene rings can be at the end of the polymer chain as well as being interspersed throughout the polymer chain.

The preparation of the crosslinkable condensation polymers of this invention can be carried out by conventional methods of preparing condensation polymers when appropriate bifunctional reactants are employed.

Polyesters containing recurring cyclobutene rings in structural units of the type described above are an especially preferred group of polymers of this invention.

These are prepared by heating a mixture of approximately equivalent quantities of dihydric alcohol and dibasic dicarboxylic acid or ester-forming derivative thereof, e.g., a halide, anhydride, or an ester formed with a volatile monohydric monohydric alcohol, at least one of these types of bifunctional groups in a structure of the type defined. The esterification is accomplished by heating the mixture to an elevated temperature. Temperatures above 100° C. should be avoided when it is desired to isolate a noncrosslinked product. The reaction can be carried out in the presence or absence of a reaction medium or solvent and in the presence or absence of an esterification catalyst. However, since the presence of a catalyst increases the rate of esterification and permits the use of lower reaction temperatures, it is preferable to employ a catalyst such as a sulfonic acid, sulfuric acid, litharge, or an alkali metal alcoholate. It is also convenient to employ a reaction medium boiling below 100° C. since this permits good control of reaction temperature when the reaction mixture is heated to reflux temperature. In the preparation of polyesters of this invention, the reaction mixture can include a monohydroxy monocarboxylic acid as one of the bifunctional reactants. If the hydroxyl and carboxyl groups of this hydroxycarboxylic acid are separated by a carbon chain containing a cyclobutene ring, the hydroxycarboxylic acid can be the sole bifunctional reactant.

Another especially preferred group of polymers included in this invention are polyamides containing recurring cyclobutene rings in structural units of the type defined. These polyamides can be prepared by heating a mixture of approximately equivalent quantities of diamine having at least one hydrogen on amino nitrogen and dicarboxylic acid or amide-forming derivative thereof, e.g., a halide, amide, nitrile, anhydride, or an ester with a monohydric alcohol, where the amide-forming reactants include a reactant having a cyclobutene ring separating the functional groups in a structure as defined above. As in the case of the preparation of the polyesters of this invention, the polyamide-forming mixture is heated at temperatures below 100° C. to prevent crosslinking of the polymer during its preparation. Conventional techniques for making polyamides at temperatures below 100° C. can be used. Thus, the mixture of amide-forming reactants can be heated at temperatures below 100° C. in the presence of catalysts such as, for example, m-cresol and a xylene dispersion of an alkali metal to increase the rate of polyamide formation. Another method which is useful is the interfacial technique in which the polyamide formed at the interface of two immiscible phases, one of which consists of a dibasic acid chloride in an organic solvent and the other consists of a mixture of aqueous sodium hydroxide and the diamine. In this method the polyamide is formed at relatively low temperatures at the interface between the two phases and can be withdrawn as a fiber from the interface. In addition to a mixture of equivalent amounts of a dicarboxylic acid and a diamine, the polyamide-forming composition can contain an amino acid as a polyamide-forming reactant. If the amino acid contains the cyclobutene ring between the amino and carboxyl groups, it can be the sole amide-forming reactant in the composition.

The condensation polymers of this invention are illustrated in further detail in the following examples, in which proportions of ingredients are expressed in parts by weight unless otherwise noted. Examples I to VIII illustrate the preparation of cyclobutene ring-containing polyesters and their crosslinked products.

*Example I*

A mixture of 340 parts of dimethyl 1-cyclobutene-1,2-dicarboxylate, prepared by the method of Perkin, J. Chem. Soc. 65, 950-978 (1894), 236 parts of hexamethylene glycol, 5 parts of m-benzenedisulfonic acid, and 5000 parts of benzene is heated under reflux for 36 hours in a reaction vessel fitted with means for continuously removing the methyl alcohol which is formed as a by-product. At the end of this time the benzene is removed from the mixture by distillation with the temperature of the mixture held at less than 100° C. The resulting polyhexamethylene 1-cyclobutene - 1,2 - dicarboxylate is a viscous oil. This polyester is soluble in benzene.

A similar crosslinkable polyester, polyhexamethylene 3-methyl-1-cyclobutene-1,2-dicarboxylate, is obtained by reacting equivalent proportions of the dimethyl ester of 3-methyl-1-cyclobutene-1,2-dicarboxylic acid (prepared by the method of Perkin starting with β-methyladipyl chloride instead of adipyl chloride) and hexamethylene glycol in accordance with the above procedure. Likewise, polyhexamethylene 3,3-diethyl - 1 - cyclobutene - 1,2 - dicarboxylate is obtained by substituting the dimethyl ester of 3,3-diethyl-1-cyclobutene-1,2-dicarboxylic acid (prepared by the method of Perkin starting with β,β-diethyladipyl chloride instead of adipyl chloride) for the ester of 1-cyclobutene-1,2-dicarboxylic acid in the above reaction, and polyhexamethylene 3,4 - dimethyl-1-cyclobutene-1,2-dicarboxylate is obtained by substituting the dimethyl ester of 3,4-dimethyl-1-cyclobutene-1,2-dicarboxylic acid, prepared by the method of Perkin starting with β,β'-dimethyladipyl chloride instead of adipyl chloride.

*Example II*

Fifty parts of the polyester from dimethyl 1-cyclobutene-1,2-dicarboxylate and hexamethylene glycol of Example I is heated in a glass reaction vessel with the free flame of a Bunsen burner. After very mild heating, the composition crosslinks to a solid rubbery product which is no longer soluble in benzene.

*Example III*

Fifty-part portions of the condensation polymer from dimethyl 1-cyclobutene-1,2-dicarboxylate and hexamethylene glycol of Example I are heated in vacuo (about 1 mm. of Hg) at 218° C. and at 172° C. Virtually instanteous solidification occurs in the polymer heated at 218° C., and solidification occurs in ten minutes in the sample heated at 172° C. Both products are insoluble in benzene.

The uniqueness of the cyclobutene ring in causing crosslinking of the condensation polymers of this invention is shown by the fact that an unsaturated polyester not possessing a cyclobutene ring is not crosslinked under similar conditions. A polyester prepared from hexamethylene glycol and dimethyl maleate in a manner similar to that used in Example I remains a benzene-soluble, viscous oil even after heating in vacuo for periods as long as one hour at 172° C.

*Example IV*

A solution containing 16.72 parts of sebacyl chloride and 5.79 parts (30 mole percent) of 1-methyl-1-cyclobutene-2,3-dicarbonyl chloride dissolved in 100 parts of chloroform is added with stirring to a solution of 22.83 parts of diphenylolpropane and 20.24 parts of triethylamine dissolved in 100 parts of chloroform. Reaction takes place at room temperature. The resulting polymer solution is washed first with a dilute aqueous acetic acid solution, then with a dilute aqueous sodium carbonate solution, and finally with water. After removal of the chloroform by distillation there is obtained a resin which softens at 88-90° C. and which is soluble in chloroform and in dimethylformamide. This resin is a polyester of diphenylolpropane, sebacic acid and 1-methyl-1-cyclobutene-2,3-dicarboxylic acid. When this polymer is pressed into a film at 1500 lb./sq. in. and 200° C., the polymer is crosslinked in two minutes. The thermoset film is insoluble in chloroform and in dimethylformamide. A bar molded from this resin at 240 lb./sq. in. pressure at 200° C. is crosslinked in three minutes under these conditions.

The 1-methyl-1-cyclobutene-2,3-dicarbonyl chloride used as starting material in Example IV is prepared as follows. An equimolar mixture of allene and maleic anhydride is heated at about 200° C. by the process which is described in detail in U.S. application Ser. No. 476,585, filed December 20, 1954, by H. N. Cripps, and now abandoned, a continuation-in-part of which issued as U.S. 2,914,541 on November 24, 1959. The resulting 1:1 adduct, 1-methylene-cyclobutane-2,3-dicarboxylic anhydride, is hydrolyzed and isomerized with aqueous alkali, e.g., aqueous sodium hydroxide, then acidified, e.g., with hydrochloric acid, to form the free cyclobutene dicarboxylic acid, which is finally treated with thionyl chloride to form the desired 1-methyl-1-cyclobutene-2,3-dicarbonyl chloride.

*Example V*

A solution containing 19.37 parts of sebacyl chloride and 1.74 parts (10 mole percent) of 1-methyl-1-cyclobutene-2,3-dicarbonyl chloride dissolved in 100 parts of chloroform is added to a solution of 22.83 parts of diphenylolpropane and 20.24 parts of triethylamine dissolved in 100 parts of chloroform. Reaction takes place at room temperature and the resulting polymer solution is washed first with a dilute aqueous acetic acid solution, then by dilute aqueous sodium carbonate and finally with water. After removal of the chloroform by distillation there is obtained a resin which softens at 55–60° C. and is soluble in chloroform. This resin is a polyester of diphenylolpropane with sebacic acid and 1-methyl-1-cyclobutene-2,3-dicarboxylic acid having a lower proportion of the cyclobutene ring-containing monomer than the polymer of Example IV. When this polymer is heated at 250° C. for ten minutes, it is crosslinked and is insoluble in chloroform and in dimethylformamide.

*Example VI*

A solution containing 17.38 parts of 1-methyl-1-cyclobutene-2,3-dicarbonyl chloride dissolved in 100 parts of chloroform is added to a solution of 6.21 parts of ethylene glycol and 20.24 parts of triethylamine in 100 parts of chloroform. Polymerization takes place at room temperature. The resulting polymer solution is washed with a dilute aqueous acetic acid solution, a dilute aqueous sodium carbonate solution and finally by water. After removal of the chloroform by distillation there is obtained a gummy material which softens at 35–37° C. and is capable of being formed into shaped objects at slightly higher temperatures, e.g., 40–50° C. This is a polyester of ethylene glycol and 1-methyl-1-cyclobutene-2,3-dicarboxylic acid. The polymer is cast into a mold and is thermoset (crosslinked) at 170° C. in five minutes. The thermoset shaped product is insoluble in chloroform and in dimethylformamide.

*Example VII*

A solution containing 10.15 parts of terephthaloyl chloride and 9.65 parts (50 mole percent) of 1-methyl-1-cyclobutene-2,3-dicarbonyl chloride dissolved in 100 parts of chloroform is added to a solution of 6.21 parts of ethylene glycol and 20.24 parts of triethylamine dissolved in 100 parts of chloroform. Reaction takes place at room temperature. The resulting polymer solution is washed first with a dilute aqueous acetic acid solution, then by a dilute aqueous sodium carbonate solution and finally by water. After removal of the chloroform by distillaton there is obtained a polyester of ethylene glycol with terephthalic acid and 1-methyl-1-cyclobutene-2,3-dicarboxylic acid. This polymer is capable of being formed into shaped objects by slight warming (to about 40–50° C.) and it is soluble in chloroform. The polymer is cast into a mold and is heated at 180° C. for five minutes. The resulting shaped polymer is crosslinked and the thermoset polymer is insoluble in chloroform.

*Example VIII*

A mixture of 5 parts of 1-methyl-1-cyclobutene-2,3-dicarboxylic acid, 2 parts of ethylene glycol and 30 parts of toluene is refluxed with continuous removal of the water formed as a by-product of the reaction. After removal of toluene from the reaction mixture, there is obtained a polyester of ethylene glycol and 1-methyl-1-cyclobutene-2,3-dicarboxylic acid. This polymer is capable of being formed into desired shapes by warming to about 40–50° C. and is soluble in ethylene dichloride. The polymer is cast into a mold and is thermoset (crosslinked) by heating at 200° C. for ten minutes. The thermoset polymer is insoluble in ethylene dichloride.

Other crosslinkable cyclobutene ring-containing polyesters can be prepared in a similar manner to those of Examples I to VIII. The hexamethylene glycol of Example I can be replaced by ethylene glycol, triethylene glycol, trimethylene glycol, tetramethylene glycol, decamethylene glycol, diphenylolpropane, and N,N-diethanolaniline in the process of that example.

A crosslinkable polyester can also be prepared by condensing a glycol, e.g., ethylene glycol, with a cyclobutene ring-containing dibasic acid anhydride having a nitrile group attached to one of the annular carbons of the cyclobutene ring. An example of a dibasic acid anhydride of this type is 1-cyano-1-cyclobutene-3,4-dicarboxylic acid anhydride, which can be prepared from allene and maleic anhydride as follows: The 1:1 adduct of allene and maleic anhydride, 3-methylenecyclobutane-1,2-dicarboxylic acid anhydride, is treated with ozone to convert the methylene group to the oxo, O=, group. Treatment of the resulting oxo compound with hydrogen cyanide and ammonium chloride in a Strecher-type synthesis gives 3-amino-3-cyanocyclobutane-1,2-dicarboxylic anhydride. The trimethylammonium iodide salt of the amino group in this compound is then formed, which on heating with aqueous alkali to 125° C. gives 1-cyano-1-cyclobutene-3,4-dicarboxylic anhydride. Condensation of this anhydride with ethylene glycol gives a polyester having the following recurring structural units:

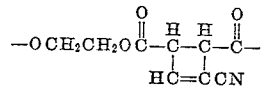

A crosslinkable polyester can also be made by condensing a dihydric alcohol having a cyclobutene ring in the carbon chain separating the two hydroxyl groups, e.g., 1,2-di(hydroxymethyl)-1-cyclobutene, prepared by lithium aluminum hydride reduction of dimethyl cyclobutene-1,2-dicarboxylate, and 3-methyl-1,2-di(hydroxymethyl)-1-cyclobutene, prepared by lithium aluminum hydride reduction of the corresponding dibasic ester with a dicarboxylic acid or an ester-forming derivative thereof, e.g., malonic acid, succinic acid, maleic acid, adipic acid, suberic acid, terephthalic acid, p-phenylenediacetic acid, thioldibutyric acid, and anhydrides, acid halides, half esters, and diesters thereof. If desired, both the acidic and alcoholic bifunctional reactants can contain a cyclobutene ring. The thermally cross-linkable polyesters of this invention can also be made by the self-condensation of a hydroxy carboxylic acid or ester in which the hydroxyl and carboxyl groups are separated by a chain containing a cyclobutene group, e.g., 3-hydroxymethyl-1-carboxyl-cyclobutene or an ester thereof. This bifunctional compound is prepared as follows. An equimolar mixture of allene and acrylonitrile is heated to about 200° C. by the process described in the aforementioned U.S. application Ser. No. 476,585, a continuation-in-part of which issued as U.S. 2,914,541 on November 24, 1959, and the 1:1 adduct is isolated. Bromine is added to the double bond of the 3-methylenecyclobutene-1-carbonitrile, and the resulting dibromo compound is hydrolyzed with aqueous sodium hydroxide and finally neutralized with hydrochloric acid to give the desired 3-hydroxymethyl-1-carboxy-1-cyclobutene.

The polyesters of this invention can also be prepared from mixtures of the above-mentioned bifunctional reactants, at least one of the reactants containing a cyclobutene ring in the carbon chain separating the two functional groups, the reaction mixture containing substantially equivalent quantities of hydroxyl and carboxyl groups.

The following examples illustrate the preparation of cyclobutene ring-containing polyamides and their crosslinked products:

*Example IX*

A reaction vessel equipped with a reflux condenser is charged with 0.953 part of dimethyl 1-cyclobutene-1,2-dicarboxylate, 0.650 part of hexamethylenediamine, 1.12 part of m-cresol, approximately 1 part of a dispersion of sodium in xylene, and about 21 parts of xylene. The mixture is heated for 20 hours on a steam bath. At the end of this time a dark brown polymer has separated from the brown solution. This brown polyamide is dried in a vacuum oven at 70° C. and there is obtained 0.5 part of brittle brown polyhexamethylene-1-cyclobutene-1,2-dicarboxamide having an inherent viscosity of 0.12 measured in m-cresol. The polymer softens at about 45° C. and is a tacky melt by 70°. Brittle fibers about one inch long can be drawn from the melt. The polymer is soluble in methanol and in ethanol, and is swollen by chloroform, carbon tetrachloride, and acetone.

*Example X*

The polyamide of Example IX is heated at 170° C. for 10 minutes. The resulting crosslinked polymer is brittle and is insoluble in methanol and ethanol.

*Example XI*

A solution containing 16.72 parts of sebacyl chloride and 5.79 parts (30 mole percent) of 1-methyl-1-cyclobutene-2,3-dicarbonyl chloride dissolved in 100 parts of chloroform is added to a solution of 17.41 parts of 2-methoxymethyl-5-methylhexamethylenediamine and 20.24 parts of triethylamine dissolved in 100 parts of chloroform. The reaction takes place at room temperature and the resulting polymer solution is washed with dilute aqueous acetic acid. The polymer is precipitated by pouring the solution into an excess of diethyl ether. The resulting polyamide of sebacic and 1-methyl-1-cyclobutene-2,3,-dicarboxylic acids with 2-methoxymethyl-5-methylhexamethylenediamine, softens at 88–90° C. and is soluble in ethanol. A film pressed from this polymer at 1500 lb./sq. in. pressure is thermoset (crosslinked) in two minutes at 200° C. The thermoset polymer is insoluble in ethanol. A bar molded at 500 lb./sq. in. pressure is thermoset (crosslinked) in three minutes at 200° C.

Other crosslinkable cyclobutene ring-containing polyamides can be prepared in a similar manner to those of Examples IX to XI. For example, the dimethyl 1-cyclobutene-1,2-dicarboxylate of Example IX can be replaced by 1-methyl-1-cyclobutene-2,3-dicarboxylic acid, 3,3-diethyl-1-cyclobutene-1,2-dicarboxylic acid, and 3,4-dimethyl-1-cyclobutene-1,2-dicarboxylic acid or amide-forming derivatives thereof, such as esters, acid halides, amides, anhydrides, and nitriles. Similarly, the process of Example IX can be repeated with the hexamethylenediamine replaced with any other diamine which contains at least one hydrogen atom attached to each amino nitrogen atom. Such diamines include ethylenediamine, 3-methylhexamethylenediamine, decamethylenediamine, and m-phenylenediamine.

Another type of polyamide included by the products of this invention is that in which only one of the annular carbons of the cyclobutene ring is intralineal with the main polymer chain. A polymer of this type having the following recurring structural units

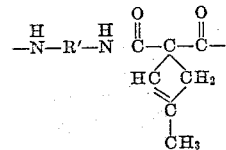

can be prepared as follows. Isobutylene dibromide is added to diethyl malonate to form 1-methylene-3,3-dicarbethoxy-cyclobutane. Treatment of this compound with hydrogen iodide gives 1-iodo-1-methyl-3,3-dicarbethoxy-cyclobutane. This compound is dehydrohalogenated by means of a mild base, e.g., triethylamine to 1-methyl-3,3-dicarbethoxy-1-cyclobutene. A polyamide is prepared from this dibasic ester by condensation with a diamine such as, for example, ethylenediamine, in which case the R′ in the above formula is the —CH$_2$CH$_2$— group.

Another example of a polyamide having but one annular carbon of the cyclobutene ring as an intralinear part of the polymer chain can be prepared from a diamine having the cyclobutene ring in the chain of atoms separating the two amino groups. Such a polyamide has the following recurring structural unit:

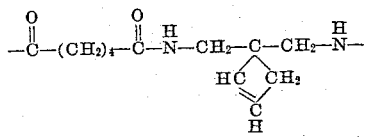

The polymer can be prepared as follows. 1-bromo-3-chloropropane and dicyanomethane are heated in the presence of sodium ethylate to form 1,1-dicyanocyclobutane. Treatment of this compound with chlorine in the presence of light gives 3-chloro-1,1-dicyanocyclobutane and 2-chloro-1,1-dicyanocyclobutane. Treatment of this mixture of isomers with an amine, e.g., triethylamine, removes hydrogen chloride with an the formation of 1,1-dicyano-2-cyclobutene. Lithium aluminum hydride reduction of this compound forms 1,1-di(aminomethyl)-2-cyclobutene. Reaction of this diamine with adipyl chloride gives a polyamide having the recurring structural unit shown above. This polyamide can be crosslinked by heating at 100°–325° C.

The bifunctional amide-forming reactants can also comprise an amino acid or amide-forming derivative thereof containing a cyclobutene ring in the carbon chain separating the two functional groups. Such a bifunctional reactant can be, for example, 3-(aminomethyl)-1-carbomethoxy-1-cyclobutene. This bifunctional amino acid can be prepared by the peroxide-catalyzed addition of hydrogen bromide to 3-methylene-1-cyclobutane-1-carbonitrile, which is then reacted with ammonia to form 3-aminomethylcyclobutane-1-carbonitrile. The free amino group of this compound is acetylated with acetic anhydride and the compound is then brominated in the position alpha to the nitrile group. The resulting bromo compound is hydrolyzed with aqueous sodium hydroxide to the sodium salt of 3-(aminomethyl)-1-carboxyl-1-cyclobutene. The salt is converted to the ester by neutralization with hydrochloric acid followed by esterification with methanol. Mixtures of the above dicarboxylic acids and amide-forming derivatives thereof with complementary bifunctional amide-forming reactants can be used, provided at least one of the reactants contains a cyclobutene ring in a structure of the type defined.

Another polyamide made from an amino acid having but one of the annular carbons of the cyclobutene ring as an integral part of the polymer chain, and which is crosslinkable by heating at 100°–325° C., is one having the following recurring structural units:

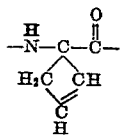

This polymer can be prepared as follows. 1-methylene-3-cyclobutyltrimethylammonium iodide is treated with ozone to convert the methylene group to the oxo group, which is in turn reacted with hydrogen cyanide and ammonium chloride in a Strecher-type synthesis to form the 1-amino-1-cyano derivative. Hydrolysis with hydrochloric acid forms the hydrochloride of 1-amino-1-carboxy-3-cyclobutyltrimethylammonium chloride. The quaternary ammonium radical is removed from this compound by heating in the presence of aqueous alkali at about 125° C. Following neutralization, the resulting 1-amino-1-carboxy-2-cyclobutene is converted to the N-carboanhydride by treatment with phosgene in dioxane at 80° C., which is then converted to the polyamide having the recurring structural units illustrated above, by decomposition in an inert solvent, e.g., benzene.

While polyesters and polyamides having recurring cyclobutene rings in the polymer chain are especially valuable, other condensation polymers having recurring cyclobutene rings which are intralineal with the polymer chain are also included in this invention. Condensation polymers having different functional groups possess different properties due to the presence of these functional groups, but all such polymers having recurring cyclobutene rings in the polymer chain possess the common characteristic of rapid crosslinking by thermal treatment. Other types of condensation polymers included in this invention are illustrated below.

The polymers can contain ether oxygen atoms in the chain separating the functional groups if desired. For example, 1,2-dihydroxymethyl-1-cyclobutene prepared by lithium aluminum hydride reduction of the corresponding 1,2-dicarboxy-1-cyclobutene can be reacted with ethylene oxide in accordance with the following equation:

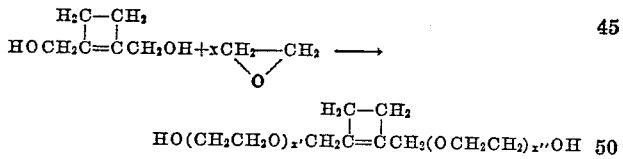

where $x$, $x'$ and $x''$ are small positive whole numbers and $x$ is equal to the sum of $x'$ and $x''$. On reaction of the resulting dihydric ether alcohol containing a cyclobutene ring with a dibasic acid, e.g., adipic acid, a condensation polymer having the following recurring structural unit is obtained:

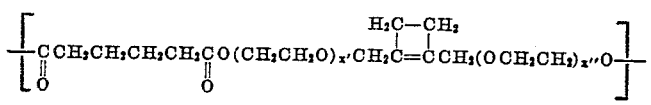

This type of polymer is readily crosslinked by heating to a temperature of 100°–325° C.

Another type of polymer included in this invention is one having sulfur atoms as the heteroatoms in the polymer chain. This type of polymer can be obtained by condensing a diakyl ester of a cyclobutene-1,2-dicarbothiolic acid,

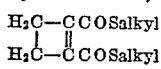

prepared from 1-cyclobutene-1,2-dicarbonyl chloride and an alkanethiol, with propane-1,3-dithiol,

The resulting crosslinkable polymer has the following recurring structural unit:

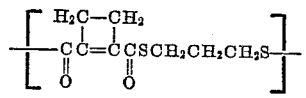

Another type of polymer included in this invention is one having disulfide linkages in the polymer chain. This type of polymer can be prepared as follows. 1,2-dimethylenecyclobutane is chlorinated to 1,2-bis(chloromethyl)-1-cyclobutene. Treatment of this dichloride with sodium disulfide gives a crosslinkable polymer having the following recurring structural units:

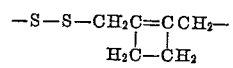

Still another type of polymer included in this invention is a polyurethane containing a cyclobutene ring as an integral part of the polymer chain. In this embodiment, a glycol having a cyclobutene ring between the hydroxyl groups, e.g.,

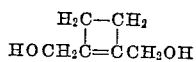

can be reacted with a diisocyanate, e.g., hexamethylenediisocyanate, to form a polyurethane having the following recurring structural unit:

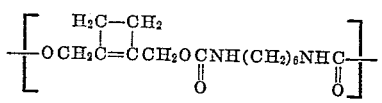

Alternately the diisocyanate can have a cyclobutene ring separating the isocyanate groups or both the glycol and the diisocyanate can have cyclobutene groups.

When a diamine containing a cyclobutene group separating the amino groups, e.g.,

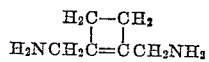

(prepared from 1,2-bis(chloromethyl)-1-cyclobutene by treatment under pressure with ammonia) is condensed with a diisocyanate, e.g., hexamethylenediisocyanate, another type of crosslinkable condensation polymer of this invention, a polyurea, is obtained. This polymer has the following recurring structural unit:

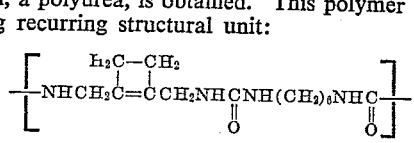

The cyclobutene ring-containing polymers of this invention can also be prepared in two steps by first condensing a bifunctional reactant having a cyclobutane ring separating the functional groups (attached to the 1 and 2 positions of the butane ring) and also having one chlorine or bromine atom on each of the 1 and 2 ring carbons, with a complementary bifunctional reactant to form a saturated condensation polymer, and then removing the halogens on the cyclobutane ring by treatment with a dehalogenating agent such as potassium iodide in acetone, or zinc, to form cyclobutene rings in the polymer. The resulting unsaturated polymer can be crosslinked in the usual manner by heating to temperatures of 100°–325° C.

The ease with which the linear polymers of this invention crosslink makes them valuable in a variety of applications. Shaped articles can be formed in the usual manner for the corresponding linear polymers of the prior art which do not have intralinear cyclobutene rings. A simple heat treatment then changes the shaped polymers into a cross-linked polymer of greatly improved resistance to heat and solvent. In this manner shaped articles can be prepared which comprise substantially infusible and insoluble crosslinked polymer. The molecular weight of the polymer is increased by the crosslinking, so the linear form of polymer can be of relatively low molecular weight. This is frequently an advantage in preparing shaped articles or in applying coatings on surfaces.

The polymers of this invention are particularly useful when incorporated in printing inks since such inks can be set very rapidly by a heat treatment. This rapid setting of printing inks is important as a factor in obtaining increased printing rates on modern printing equipment. At the present time the rate of printing is controlled by the rate at which the ink sets on the printed sheet. Consequently, improvements in the rate of setting will increase the rate at which the machines can be operated.

Other applications of particular importance in which the polymers of this invention can be used include their use in the formation of finishes which can be very rapidly set by heat alone after being coated on various surfaces. The polymers are valuable adhesives, e.g., for bonding laminates, as the adhesive can be quickly set by simple heat-treatment. The thermoplastic nature of the adhesive before setting is a distinct advantage when forming shaped laminates. The polymers of this invention are also useful for the formation of fibers which can be crosslinked by heating to prevent shrinkage and to increase the solvent resistance of the fibers. Elastomeric polymers obtained in accordance with this invention, e.g., polyurethanes having cyclobutene rings as integral parts of the polymer chain, are also especially useful because they can be rapidly crosslinked by a simple heat treatment.

Since many different embodiments of the invention may be made without departing from the spirit and scope thereof, it is to be understood that the invention is not limited by the specific illustrations except to the extent defined in the following claims.

What is claimed is:
1. Polyhexamethylene 1-cyclobutene-1,2-dicarboxylate.
2. A polyester of diphenylolpropane with sebacic acid and 1-methyl-1-cyclobutene-2,3-dicarboxylic acid.
3. A polyester of ethylene glycol and 1-methyl-1-cyclobutene-2,3-dicarboxylic acid.
4. Polyhexamethylene - 1 - cyclobutene - 1,2 - dicarboxamide.
5. Polyamide of sebacic and 1-methyl-1-cyclobutene-2,3-dicarboxylic acids with 2-methoxymethyl-5-methylhexamethylenediamine.

References Cited in the file of this patent
UNITED STATES PATENTS
2,421,876 Gerhart _____ June 10, 1947

OTHER REFERENCES
Perkin: "Journal of the Chemical Society (London)," vol. 65, pages 950–978 (1894).
Domnin et al.: "Chemical Abstracts," vol. 42, page 4149 (1948).